(12) United States Patent
Cheng et al.

(10) Patent No.: US 10,692,461 B2
(45) Date of Patent: Jun. 23, 2020

(54) DISPLAY DEVICE, MANUFACTURING METHOD THEREOF, AND COUNTER SUBSTRATE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Xiaoliang Cheng, Beijing (CN); Ke Dai, Beijing (CN); Chunyang Nie, Beijing (CN); Wenwu Lu, Beijing (CN); Xueqin Wei, Beijing (CN); Bingbing Yan, Beijing (CN); Hailong Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 163 days.

(21) Appl. No.: 15/723,660

(22) Filed: Oct. 3, 2017

(65) Prior Publication Data

US 2018/0240434 A1  Aug. 23, 2018

(30) Foreign Application Priority Data

Feb. 21, 2017  (CN) .......................... 2017 1 0094070

(51) Int. Cl.
 *G09G 3/36* (2006.01)
 *G02F 1/1343* (2006.01)
 *G02F 1/1335* (2006.01)

(52) U.S. Cl.
 CPC ......... *G09G 3/3696* (2013.01); *G02F 1/1343* (2013.01); *G02F 1/133512* (2013.01);
 (Continued)

(58) Field of Classification Search
 CPC .............. G09G 3/3696; G09G 3/3655; G09G 2360/142; G09G 2320/0247; G09G 3/36;
 (Continued)

(56) References Cited

U.S. PATENT DOCUMENTS 5,189,536 A * 2/1993 Hanyu ................. G02F 1/1416
 349/134
7,633,550 B1 * 12/2009 Starr ....................... G09G 3/20
 348/180

(Continued)

FOREIGN PATENT DOCUMENTS

| CN | 101901574 A | 12/2010 |
| CN | 103091886 A | 5/2013 |
| CN | 104880842 A * | 9/2015 |

OTHER PUBLICATIONS

First Office Action for Chinese Patent Application No. 201710094070.1 dated Mar. 21, 2019.

*Primary Examiner* — Jose R Soto Lopez
(74) *Attorney, Agent, or Firm* — Calfee, Halter & Griswold LLP

(57) ABSTRACT

The present disclosure provides a display device, a manufacturing method thereof, a driving method thereof and a counter substrate. The display device includes a liquid crystal cell, at least one flicker detector and a signal processing apparatus. The at least one flicker detector is disposed in a non-display region within the liquid crystal cell and configured to detect light intensity in the liquid crystal cell; and the signal processing apparatus is configured to adjust a magnitude of a common voltage for driving the liquid crystal cell according to a signal strength outputted from the flicker detector, to reduce a flicker value of the display device.

16 Claims, 4 Drawing Sheets

(52) U.S. Cl.
CPC .. *G02F 1/133514* (2013.01); *G02F 1/133528* (2013.01); *G09G 3/3655* (2013.01); *G09G 2320/0247* (2013.01); *G09G 2360/142* (2013.01)

(58) Field of Classification Search
CPC .............. G09G 2320/02; G02F 1/1343; G02F 1/133512; G02F 1/133514; G02F 1/133528; G02F 1/13318
See application file for complete search history.

(56) References Cited

U.S. PATENT DOCUMENTS

| | | | | |
|---|---|---|---|---|
| 10,444,490 B1* | 10/2019 | Guntaka | ................ | G02B 1/12 |
| 2002/0011978 A1* | 1/2002 | Yamazaki | ................ | G09G 3/30 |
| | | | | 345/87 |
| 2005/0067553 A1* | 3/2005 | Agari | ................ | G02F 1/1336 |
| | | | | 250/205 |
| 2007/0063957 A1* | 3/2007 | Awakura | ............ | G02F 1/13318 |
| | | | | 345/98 |
| 2007/0139343 A1* | 6/2007 | Wang | ................ | G09G 3/3655 |
| | | | | 345/98 |
| 2007/0146260 A1* | 6/2007 | Kang | ................ | G09G 3/3655 |
| | | | | 345/87 |
| 2008/0180419 A1* | 7/2008 | Tung | ................ | G09G 3/3655 |
| | | | | 345/204 |
| 2009/0073107 A1* | 3/2009 | Chen | ................ | G09G 3/3406 |
| | | | | 345/102 |
| 2009/0262103 A1* | 10/2009 | Huang | ................ | G09G 3/3611 |
| | | | | 345/212 |
| 2010/0007640 A1* | 1/2010 | Suguro | ................ | G09G 3/3614 |
| | | | | 345/208 |
| 2011/0001723 A1* | 1/2011 | Fan | ................ | G06F 3/0412 |
| | | | | 345/174 |
| 2012/0037905 A1* | 2/2012 | Murai | ................ | G06F 3/0412 |
| | | | | 257/53 |
| 2012/0212466 A1* | 8/2012 | Kohtoku | ............ | G02F 1/133385 |
| | | | | 345/207 |
| 2012/0212467 A1* | 8/2012 | Kohtoku | ................ | G02F 1/1354 |
| | | | | 345/207 |
| 2012/0229408 A1* | 9/2012 | Yamamoto | ............ | G06F 3/0412 |
| | | | | 345/173 |
| 2013/0021349 A1* | 1/2013 | Kohtoku | ............ | G02F 1/13318 |
| | | | | 345/501 |
| 2016/0180781 A1* | 6/2016 | Kim | ................ | G06F 3/0416 |
| | | | | 345/212 |
| 2016/0313614 A1* | 10/2016 | Woo | ................ | G02F 1/136204 |
| 2016/0342251 A1* | 11/2016 | Chen | ................ | G06F 3/041 |
| 2017/0162100 A1* | 6/2017 | Chen | ................ | G09G 3/2007 |
| 2017/0307933 A1* | 10/2017 | Chen | ................ | G02F 1/133516 |
| 2018/0052359 A1* | 2/2018 | Umemoto | ............ | G02F 1/1333 |
| 2018/0218655 A1* | 8/2018 | Zhang | ................ | G09G 3/3696 |
| 2018/0292707 A1* | 10/2018 | Chen | ................ | G02B 5/3058 |
| 2018/0321788 A1* | 11/2018 | Kimura | ............ | G02F 1/13306 |
| 2018/0348958 A1* | 12/2018 | Lee | ................ | G02F 1/13338 |

* cited by examiner

DISPLAY DEVICE, MANUFACTURING METHOD THEREOF, AND COUNTER SUBSTRATE

CROSS-REFERENCE

The present application is based upon and claims priority to Chinese Patent Application No. 201710094070.1, filed on Feb. 21, 2017, and the entire contents thereof are incorporated herein by reference.

TECHNICAL FIELD

The present disclosure relates to a display device, a manufacturing method thereof, a driving method thereof and a counter substrate.

BACKGROUND

Liquid crystal display devices are favored by consumers and suitable for a variety of electronic devices due to its low power consumption. The main operation principle is utilizing an electric field through liquid crystals to control light transmission for displaying an image. A pixel electrode and a common electrode included in a liquid crystal display device are generally referred to as a driving electrode.

An absolute value of a voltage difference between the pixel electrode and the common electrode is referred to as a driving voltage of the driving electrode. The magnitude of the driving voltage may be used to control a degree of rotation of liquid crystal molecules, and in turn, to control the light transmission of the liquid crystal display device. The positive or negative polarity of the driving voltage of the driving electrode is defined based on the common electrode. When the voltage of the pixel electrode is higher than the voltage of the common electrode, the polarity is positive, and when the voltage of the pixel electrode is lower than the voltage of the common electrode, the polarity is negative. The polarity of the driving electrode may be used to control the direction of rotation of the liquid crystal molecules.

In practice, when displaying images, if the liquid crystal molecules have been continuously operated with a polarity for a long time period, the liquid crystal molecules may be damaged due to polarization, and may not be restored. Therefore, it is necessary to invert the polarity of the driving voltage at regular intervals, that is, to change the voltage of the driving electrode so that the polarity of the driving voltage is changed between the positive polarity and the negative polarity. For example, the voltage of the pixel electrode may is changed around the common voltage periodically.

SUMMARY

An embodiment of the present disclosure provides a display device. The display device includes a liquid crystal cell, at least one flicker detector and a signal processing apparatus. The at least one flicker detector is disposed in a non-display region within the liquid crystal cell and configured to detect light intensity in the liquid crystal cell; and the signal processing apparatus is configured to adjust a magnitude of a common voltage for driving the liquid crystal cell according to a signal strength outputted from the flicker detector, to reduce a flicker value of the display device.

Another embodiment of the present disclosure provides a manufacturing method of a display device. The manufacturing method includes: forming a liquid crystal cell; providing a flicker detector, the flicker detector being formed in a non-display region of the liquid crystal cell and configured to detect light intensity of the liquid crystal cell in operation; and providing a signal processing apparatus disposed outside the liquid crystal cell and configured to adjust a magnitude of a common voltage for driving the liquid crystal cell according to a signal strength outputted from the flicker detector, to reduce a flicker value of the display device.

Yet another embodiment of the present disclosure provides a driving method of a display device. The driving method includes: detecting a light intensity in a liquid crystal cell, and adjusting a magnitude of a common voltage for driving the liquid crystal cell according to a signal strength outputted from a flicker detector, to reduce a flicker value of the display device.

Yet another embodiment of the present disclosure provides a counter substrate. The counter substrate includes: an upper polarizing layer; and at least one flicker detector disposed in the counter substrate and located on a light exit side of the upper polarizing layer.

BRIEF DESCRIPTION OF THE DRAWINGS

In order to more clearly illustrate the technical solution of the embodiments of the present disclosure, the following drawings, which are to be used in the description of the embodiments or related art, will be briefly described. It will be apparent that the drawings described in the following description refer only to some embodiments of the present disclosure and are not limitation to the present disclosure.

DETAILED DESCRIPTION

Figure 1:
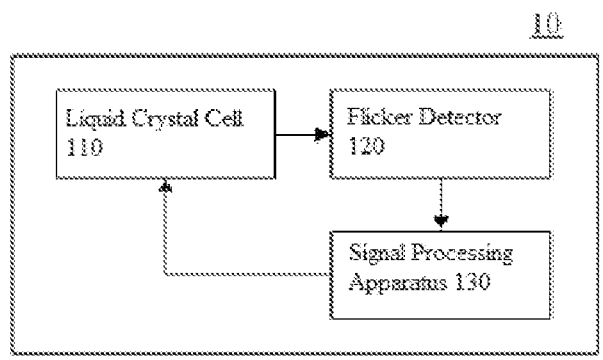
FIG. 1 is an exemplary block diagram of a display device provided by an embodiment of the present disclosure.

Hereinafter, the technical solutions of embodiments of the present disclosure will be described more fully and clearly with reference to non-limiting exemplary embodiments shown in the drawings and detailed in the following description. The exemplary embodiments and their various features and advantageous details of the present disclosure will be illustrated more fully. It should be noted that the features shown in the figures are not necessarily drawn to scale. The present disclosure omits the description of known materials, components, and process techniques so as not to obscure the exemplary embodiments of the present disclosure. The examples given are intended only to facilitate understanding of the implementation of the exemplary embodiments of the present disclosure, and to further enable those skilled in the art to practice the exemplary embodiments. Thus, these examples should not be construed as limiting the scope of the embodiments of the present disclosure.

Unless otherwise specifically defined, technical terms or scientific terms used in this disclosure should be of ordinary sense to those skilled in the art to which this disclosure pertains. The words "first", "second" and the like used in this disclosure do not denote any order, quantity or importance but are merely used to distinguish between different components. In addition, in the various embodiments of the present disclosure, the same or similar reference numerals denote the same or similar members.

The inventor has found that when a voltage of a common electrode is not equal to an average value of voltages of a pixel electrode at positive and negative polarities and thus driving voltages at the positive and negative polarities are not equal, a liquid crystal display device may flicker. For example, when the voltage of the common electrode is 1.5 V and the voltages of the pixel electrode at the positive and negative polarities are respectively 3 V and −1 V, the driving voltages at the positive and negative polarities are 1.5 V and 2.5 V, respectively. In this case, luminous intensity of the liquid crystal display device is time-variable, resulting in flicker.

Since the liquid crystal display device generates an additional electric field in a polarity inversion driving mode, the actual common voltage is changed, and thus there is a difference between display luminance of a positive frame image (when the driving voltage is of a positive polarity) and a negative frame image (when the driving voltage is of a negative polarity), resulting in flicker and drift of the liquid crystal display device in the polarity inversion driving mode. That is, in the polarity inversion driving mode, the value of the common voltage which may cause the lowest flicker value may change. The degree of flicker and drift of each display device may be different due to variations in process or material characteristics, etc. Therefore, it is necessary to adjust a setting value of the common voltage during the manufacturing process before the device goes to the market, so as to reduce the degree of flicker, which increases the manufacturing time and cost of the liquid crystal display device.

The embodiments of the present disclosure provide a display device, a manufacturing method thereof and a driving method thereof, and a counter substrate, which may automatically reduce the flicker value of the liquid crystal display device by automatically adjusting the common voltage based on a light intensity signal in a liquid crystal cell detected by a flicker detector.

At least one embodiment of the present disclosure provides a display device including a liquid crystal cell, at least one flicker detector and a signal processing apparatus. The at least one flicker detector is disposed in a non-display region within the liquid crystal cell and is configured to detect light intensity in the liquid crystal cell. The signal processing apparatus is configured to adjust a magnitude of a common voltage for driving the liquid crystal cell according to a signal strength outputted from the flicker detector, to reduce a flicker value of the display device. The signal processing apparatus is disposed, for example, outside the liquid crystal cell.

For example, FIG. 1 is an exemplary block diagram of a display device 10 provided by an embodiment of the present disclosure. As shown in FIG. 1, the display device 10 includes a liquid crystal cell 110, at least one flicker detector 120 and a signal processing apparatus 130.

For example, the at least one flicker detector 120 may be disposed in a non-display region within the liquid crystal cell 110 and is configured to detect light intensity in the liquid crystal cell 110. For example, the positions and the number of flicker detectors 120 in the liquid crystal cell 110 may be set as desired according to practical application, and are not particularly limited by the embodiments of the present disclosure.

For example, the liquid crystal cell 110 may include an array substrate 111 and an upper polarizing layer 112 disposed opposite to the array substrate 111, and the flicker detector 120 may be disposed at one side of the upper polarizing layer 112 away from the array substrate 111.

Figure 2A:
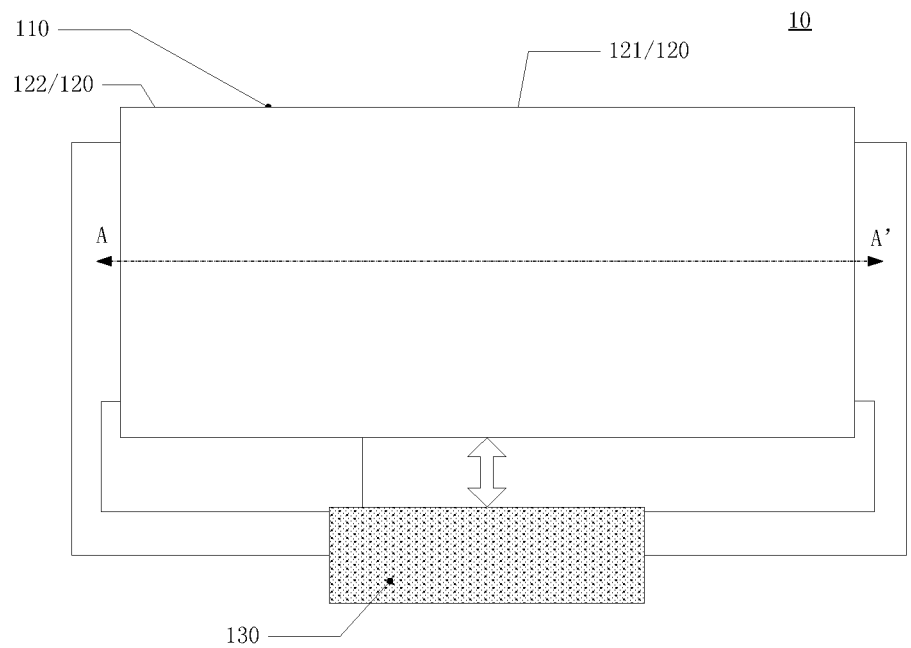
FIG. 2A is a schematic plan view of a display device provided by an embodiment of the present disclosure.
Figure 2B:
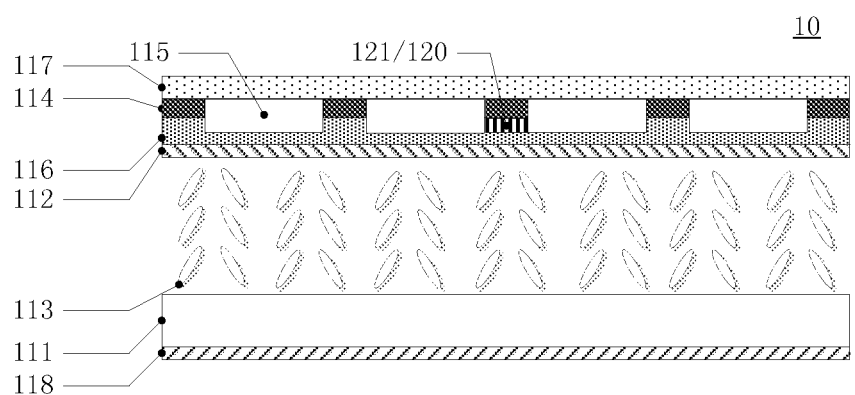
FIG. 2B is a schematic cross-sectional view of the display device as shown in FIG. 2A along a line A-A'.

For example, FIG. 2A is a schematic plan view of a display device 10 provided by an embodiment of the present disclosure, and FIG. 2B is a schematic cross-sectional view of the display device 10 as shown in FIG. 2A along a line A-A'. As shown in FIGS. 2A and 2B, the liquid crystal cell 110 may successively include a lower polarizing layer 118, the array substrate 111, a liquid crystal layer 113, the upper polarizing layer 112 having a polarization direction perpendicular to the polarization direction of the lower polarizing layer 118, a color filter layer and the like. For example, the color filter layer includes color filters 115 in an array arrangement and a black matrix 114 disposed between adjacent color filters 115. For example, the color filter 115 may be used to filter white light to obtain light of a particular color to achieve color display. For example, the black matrix 114 may be used to block light from a gap between the pixel electrodes on the array substrate 111 and to enhance contrast ratio of an image.

For example, as shown in FIG. 2B, the flicker detector 120 may be disposed on one side of the black matrix 114 adjacent to the upper polarizing layer 112 and may be configured to detect the intensity of the polarized light transmitted through the upper polarizing layer in the liquid crystal cell 110. In this case, the flicker detector 120 is disposed in the non-display region within the liquid crystal cell 110. For example, as shown in FIG. 2A, the display device 10 may include at least one central flicker detector 121. For example, one central flicker detector 121 may be disposed at the center of the liquid crystal cell 110. Alternatively, one central flicker detector 121 may be disposed at a position of ¼ height and ¼ width of the liquid crystal cell, and one central flicker detector 121 may be disposed at a position of ¾ height and ¾ width of the liquid crystal cell, and so on. The display device 10 may also include four edge flicker detectors 122, which may be disposed at four corners of the liquid crystal cell 110. For example, each of the center and the corners is located in the non-display region within the liquid crystal cell 110.

For example, the material, structure, and forming of the flicker detector 120 may be selected according to the practical application, and are not particularly limited by the embodiments of the present disclosure.

For example, the flicker detector 120 may include photoelectric induction material. For example, the photoelectric induction material may be cadmium sulfide (CdS), cadmium selenide (CdSe), cadmium telluride (CdTe), silicon (Si), germanium (Ge), zinc oxide (ZnO), nickel protoxide (NiO), as well as other suitable materials. As another example, the silicon material may be polysilicon or amorphous silicon or the like.

Figure 5:
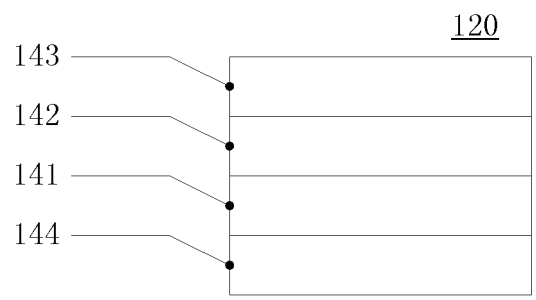
FIG. 5 is an exemplary structural diagram of a flicker detector provided by an embodiment of the present disclosure.

For example, as shown in FIG. 5, the flicker detector 120 may include a PN junction having a photosensitive characteristic and an upper electrode layer 143 and a lower electrode layer 144 disposed on the two sides of the PN junction having a photosensitive characteristic, respectively. For example, the PN junction having a photosensitive characteristic may include a P-type semiconductor layer 141 and an N-type semiconductor layer 142 in contact with each other. For example, the material and the method forming the PN junction having a photosensitive characteristic may be selected according to practical application, and are not particularly limited by the embodiments of the present application. For example, the PN junction having a photosensitive characteristic may be a homojunction type of PN junction formed by, for example, doping with the same semiconductor material. Also, for example, the flicker detector 120 may be a heterojunction PN junction formed of different semiconductor materials (photoelectric induction materials) by techniques such as epitaxial growth, vacuum deposition, etc. For example, the material forming the P-type semiconductor layer 141 may include nickel protoxide (NiO). For example, the material forming the N-type semiconductor layer 142 may be zinc oxide (ZnO). For example, the P-type semiconductor layer 141 and the N-type semiconductor layer 142 are p-doped and n-doped polysilicon layers, respectively. For example, the material forming the upper electrode layer 143 and the lower electrode layer 144 may include transparent conductive material. For example, the transparent conductive material may be indium tin oxide (ITO) or indium zinc oxide (IZO).

For example, the flicker detector 120 may be formed on a counter substrate (e.g., a color film substrate) disposed opposite to the array substrate during the manufacture process of the liquid crystal cell 110, for example, by a patterning process, and the resulting flicker detector 120 may be electrically connected to the signal processing apparatus or the like through prepared wires. Also, for example, the flicker detector 120 may be formed before the liquid crystal cell 110 is manufactured and may be disposed on one side of the upper polarizing layer 112 away from the array substrate 111 by welding, clamping, adhering or the like.

For example, in order to planarize one side of the color filter layer adjacent to the upper polarizing layer 112, the liquid crystal cell 110 may further include a flat layer 116. The flat layer 116 may be disposed on the side of the color filter 115 adjacent to the upper polarizing layer 112. For example, the flat layer 116 may be formed of inorganic or organic material. For example, the flat layer 116 may be formed of organic resin, silicon oxide (SiOx), silicon oxynitride (SiNxOy), or silicon nitride (SiNx).

Figure 3:
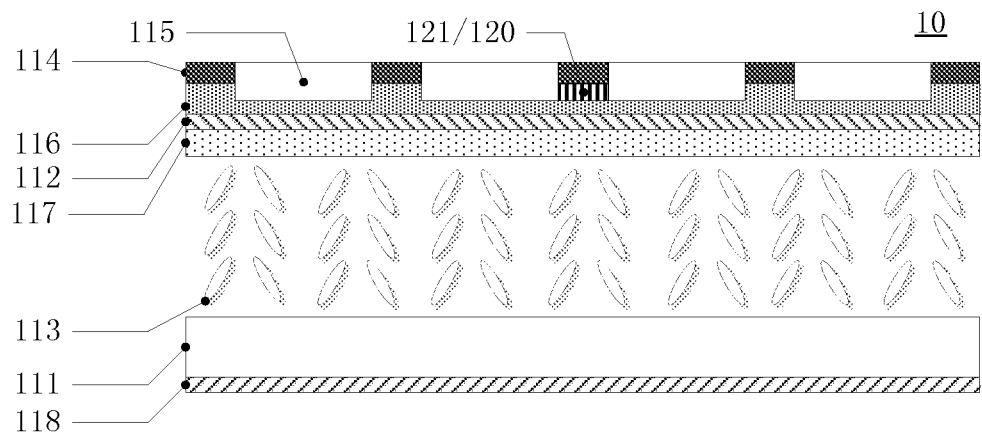
FIG. 3 is a schematic cross-sectional view of another structure of a display device provided by an embodiment of the present disclosure.

For example, the liquid crystal cell 110 may include a base substrate 117 in order to provide support and protection. For example, the base substrate 117 may be disposed on a side of the color filter layer away from the liquid crystal layer 113. For example, the base substrate 117 may be a glass substrate, a quartz substrate, a plastic substrate (e.g., a polyethylene terephthalate (PET) substrate), or a substrate made of other suitable materials. Apparently, the position of the base substrate 117 of the embodiment of the present disclosure is not limited to that shown in FIG. 2B. For example, as shown in FIG. 3, the base substrate 117 may be disposed on one side of the upper polarizing layer 112 adjacent to the liquid crystal layer 113, and the upper polarizing layer 112, the flat layer 116, the color filter 115, the black matrix 114, and the like are formed on the base substrate 117. However, this is not particularly limited by the embodiments of the present application.

For example, the display device 10 may also include a signal processing apparatus 130. For example, the signal processing apparatus 130 may be disposed outside the liquid crystal cell 110 and configured to reduce the flicker value of the display device 10 by adjusting the magnitude of the common voltage for driving the liquid crystal cell 110 according to the signal strength outputted from the flicker detector 120. For example, the function of the signal processing apparatus 130 may be implemented by an analog circuit, a digital circuit, or a combination of an analog circuit and a digital circuit according to practical applications. Alternatively, the signal processing apparatus 130 may also include a processor (e.g., an X86 processor or an ARM processor) and a memory, and the memory stores a computer program, codes that may be executed by the processor to perform signal acquisition, comparison, etc. However, this is not particularly limited by the embodiments of the present disclosure. Below, the signal processing apparatus 130 will be described in detail with reference to an example in which the function of the signal processing apparatus 130 is implemented by an analog circuit. However, the signal processing apparatus 130 provided by the embodiment of the present disclosure is not limited thereto.

For example, the signal processing apparatus 130 may include a flicker value acquisition circuit 131, a flicker value comparison circuit 132, and a common voltage adjustment circuit 133. For example, the signal processing apparatus 130 may also include a flicker-value-signal amplifying circuit 134 depending on the practical application. For example, the flicker value acquisition circuit 131, the flicker-value-signal amplifying circuit 134, the flicker value comparison circuit 132, and the common voltage adjustment circuit 133 may be implemented as corresponding circuit and may be set according to the practical application. This is not particularly limited by the embodiments of the present disclosure. For example, the common voltage adjustment circuit 133 may be a voltage generating circuit or a voltage output circuit or the like.

Figure 6:
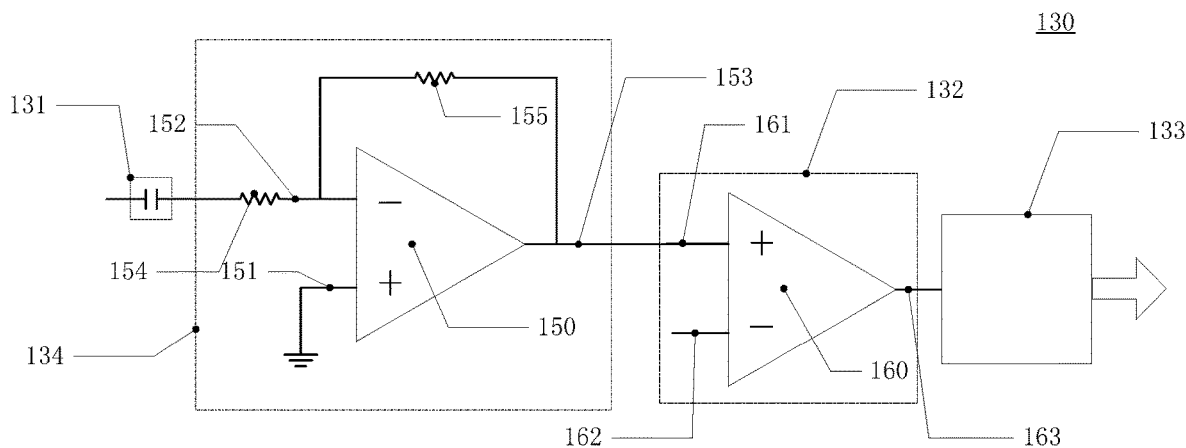
FIG. 6 is an exemplary structural diagram of a signal processing apparatus provided by an embodiment of the present disclosure.

For example, the flicker value acquisition circuit 131 may be configured to acquire a flicker value signal of the display device 10 based on the signal strength outputted from the flicker detector 120. The flicker value signal corresponds to the difference between the light intensities of the positive frame image and the negative frame image within the liquid crystal cell 100. For example, as shown in FIG. 6, the flicker value acquisition circuit 131 may include a capacitor.

For example, when the voltage of the common electrode is not equal to the average value of the voltages at the positive and negative polarities of the pixel electrode, the signal (for example, the voltage signal) outputted by the flicker detector 120 will change over time (for example, the output voltages are V1 and V2, respectively for the positive and negative frame images). Since the capacitor has a function of "conducting alternating current and blocking direct current", the capacitor may acquire a difference value (V1−V2) of the output voltages for the positive and negative frame images. The difference value (V1−V2) between the output voltages corresponds to the difference between the light intensities of the positive frame image and the negative frame image in the liquid crystal cell 110. That is, the capacitor may acquire the flicker value signal of the display device 10.

For example, the flicker value acquisition circuit 131 provided by the embodiment of the present disclosure is not limited to a capacitor, and the flicker value acquisition circuit 131 may be implemented as a difference circuit including an operational amplifier according to the practical application. The specific structure and principle of the difference circuit may refer to the conventional analog circuit, which will not be repeated herein.

Also, for example, the flicker value acquisition circuit 131 may include an analog-to-digital conversion circuit to convert the analog signal (may be for example an amplified signal) detected by the flicker detector 120 into a digital signal, and later the digital signal is used by the flicker value comparison circuit 132 for operation and comparison. The comparison result is used by the common voltage adjustment circuit 133 to adjust the magnitude of the common voltage applied to the liquid crystal cell.

For example, based on the example shown in FIG. 6, in case where a plurality of flicker detectors 120 are disposed in the liquid crystal cell 110 of the display device 10, one capacitor may be disposed for each of the flicker detectors 120, and each capacitor may acquire a difference value between the outputted voltages of the corresponding flicker detector 120 for the positive and negative frame images. The sum or the average value of the difference values between outputted voltages of the plurality of flicker detectors for positive and negative frame images may be taken as the flicker value signal of the display device 10. For example, in case where the sum of the difference values between outputted voltages of the plurality of flicker detectors for positive and negative frame images is taken as the flicker value signal of the display device 10, a summing circuit including an operational amplifier may be used to acquire the sum. The specific structure and principle of the summing circuit may refer to a conventional analog circuit, which will not be repeated herein.

For example, the flicker-value-signal amplifying circuit 134 may be configured to amplify the flicker value signal outputted from the flicker value acquisition circuit 131 and transmit the amplified flicker value signal to the flicker value comparison circuit 132. For example, as shown in FIG. 6, the flicker-value-signal amplifying circuit may be a negative feedback amplifier circuit, and the negative feedback amplifier circuit may enhance the stability of the signal amplification of the flicker-value-signal amplifying circuit 134. For example, the flicker value amplifying circuit may include a first operational amplifier 150, a first resistor 154, and a second resistor 155.

For example, the first operational amplifier 150 includes a first op-amp in-phase input terminal 151, a first op-amp inverting input terminal 152, and a first op-amp output terminal 153. The first op-amp in-phase input terminal 151 is grounded. For example, the type of the first operational amplifier 150 may be selected according to the practical application. For example, the first operational amplifier 150 may be provided as a low temperature drift type of precision operational amplifier, and thus the stability of the signal amplification of the flicker-value-signal amplifying circuit 134 may be further enhanced.

For example, the first resistor 154 may be disposed between the output terminal of the flicker value acquisition circuit 131 and the first op-amp inverting input terminal 152. The second resistor 155 may be disposed between the first op-amp inverting input terminal 152 and the first op-amp output terminal 153. For example, the resistance values of the first resistor 154 and the second resistor 155 may be set in accordance with the magnification required by the flicker-value-signal amplifying circuit 134. For example, the resistance values of the first resistor 154 and the second resistor 155 may be set to 100 kilohms and 5 kilohms, respectively, in case where the magnification required by the flicker-value-signal amplifying circuit 134 is 20 times.

For example, the flicker-value-signal amplifying circuit 134 provided by the embodiments of the present disclosure is not limited to the negative feedback amplifier circuit, and the flicker-value-signal amplifying circuit 134 may be disposed as a positive feedback amplifier circuit according to the practical application, which is not particularly limited by the embodiments of the present disclosure.

For example, the flicker value comparison circuit 132 may be configured to determine whether the value of the flicker value signal outputted by the flicker value acquisition circuit 131 is larger than a preset reference signal value and output a flicker value determination signal. For example, as shown in FIG. 6, the flicker value comparison circuit 132 may be a second operational amplifier 160. For example, the type of the second operational amplifier 160 may be selected according to practical application. For example, the second operational amplifier 160 may be set as a low temperature drift type of precision operational amplifier, and thus the precision and stability of the signal outputted from the flicker value comparison circuit 132 may be further enhanced.

For example, the second operational amplifier 160 may include a second op-amp in-phase input terminal 161, a second op-amp inverting input terminal 162, and a second op-amp output terminal 163. For example, a flicker value signal (e.g., a voltage signal) and a preset reference signal (e.g., a reference voltage signal) may be supplied respectively by the second op-amp in-phase input terminal 161 ("+" terminal) and the second op-amp inverting input terminal 162 ("−" terminal) to the operational amplifier, or may be supplied respectively by the second op-amp inverting input terminal 162 and the second op-amp in-phase input terminal 161 to the operational amplifier. The second op-amp output terminal 163 may output the flicker value determination signal acquired based on the flicker value signal and the preset reference signal.

For example, in case where the flicker value signal and the preset reference signal are supplied respectively by the second op-amp in-phase input terminal 161 and the second op-amp inverting input terminal 162 to the operational amplifier, it can be known based on the transmission characteristic of the operational amplifier that, when the value of the flicker value signal is larger than the preset reference signal value, the flicker value determination signal (for example, a voltage signal) outputted by the second op-amp output terminal 163 is a positive signal (for example, an output positive voltage), and when the value of the flicker value signal is smaller than the preset reference signal value, the flicker value determination signal outputted by the second op-amp output terminal 163 is a negative signal. Also, for example, in case where the flicker value signal and the preset reference signal are supplied respectively by the second op-amp inverting input terminal 162 and the second op-amp in-phase input terminal 161 to the operational amplifier, it can be known based on the transmission characteristic of the operational amplifier that, when the value of the flicker value signal is larger than the preset reference signal value, the flicker value determination signal outputted by the second op-amp output terminal 163 is a negative signal, and when the value of the flicker value signal is smaller than the preset reference signal value, the flicker value determination signal outputted by the second op-amp output terminal 163 is a positive signal. Therefore, it may be determined whether the value of the flicker value signal outputted by the flicker value acquisition circuit 131 is larger than the preset reference signal value.

For example, depending on practical application, the flicker value comparison circuit 132 provided by the embodiment of the present disclosure is not limited to being implemented as a single operational amplifier, the flicker value comparison circuit 132 may be implemented as a difference circuit including an operational amplifier, and the specific structure and principle of the difference circuit may refer to the conventional analog circuit, which will not be repeated herein.

For example, the common voltage adjustment circuit 133 may be configured to adjust the magnitude of the common voltage for driving the liquid crystal cell 110 to reduce the flicker value of the display device 10, when the flicker value determination signal indicates that the flicker value signal outputted from the flicker value acquisition circuit 131 is larger than the preset reference signal value. For example, the common voltage adjustment circuit 133 may be configured to increase/decrease the magnitude of the common voltage for driving the liquid crystal cell 110, when the flicker value determination signal indicates that the flicker value signal outputted from the flicker value acquisition circuit 131 is larger than the preset reference signal value. If the flicker value signal outputted by the flicker value acquisition circuit 131 is decreased, the magnitude of the common voltage for driving the liquid crystal cell 110 may be further increased/decreased, until the flicker value signal outputted by the flicker value acquisition circuit 131 is increased. If the flicker value signal outputted by the flicker value acquisition circuit 131 is increased, the magnitude of the common voltage for driving the liquid crystal cell 110 may be decreased/increased. If the flicker value signal outputted by the flicker value acquisition circuit 131 is decreased, the magnitude of the common voltage for driving the liquid crystal cell 110 may be further increased/decreased, until the flicker value signal outputted by the flicker value acquisition circuit 131 is increased. If the flicker value signal outputted by the flicker value acquisition circuit 131 is increased, and the flicker value signal outputted by the flicker value acquisition circuit 131 is also increased when the magnitude of the common voltage for driving the liquid crystal cell 110 is decreased/increased, the magnitude of the common voltage for driving the liquid crystal cell 110 is maintained unchanged. For example, the adjustment magnitude of the common voltage for driving the liquid crystal cell 110 for one time may be set according to practical application. For example, the adjustment magnitude of the common voltage for one time may be set to 0.05V.

For example, the display device 10 may detect the light intensity transmitted through the upper polarizing layer 112 in the liquid crystal cell 110 by the at least one flicker detector 120 disposed on the side of the upper polarizing layer 112 in the non-display region within the liquid crystal cell 110, away from the array substrate 111, and adjust the magnitude of the common voltage for driving the liquid crystal cell 110 by the signal processing apparatus 130 disposed outside the liquid crystal cell 110, according to the signal strength outputted from the flicker detector 120, in order to reduce the difference value between the driving voltages at the positive and negative frame images and the difference between the rotation degrees of the liquid crystal molecules at the positive and negative frame images. In turn, the difference between the rotation degrees of the polarizing directions of the polarizing light at the positive and negative frame images and the difference between the light intensities detected by the flicker detector 120 at the positive and negative frame images may be reduced, and thus the flicker value of the display device 10 may be automatically reduced.

Figure 4:
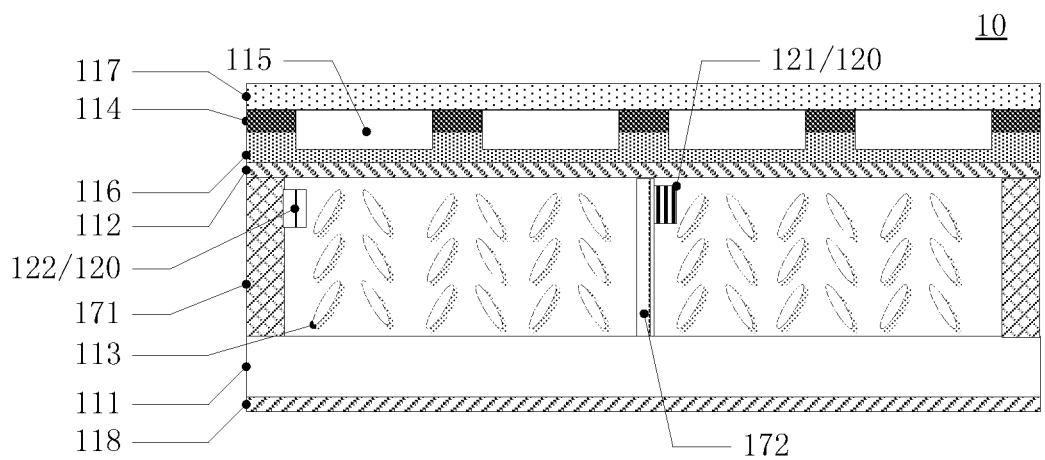
FIG. 4 is a schematic cross-sectional view of yet another structure of a display device provided by an embodiment of the present disclosure.

For example, the disposition position of the flicker detector 120 in the liquid crystal cell 110 is not limited to that shown in FIGS. 2B and 3, and may be as shown in FIG. 4, that is, the flicker detector 120 may not be disposed on the side of the upper polarizing layer 112 away from the liquid crystal layer 113. For example, the liquid crystal cell 110 may also include a sealing frame 171 and a spacer 172. For example, the sealing frame 171 may be disposed in the peripheral region of the liquid crystal cell 110 to confine the liquid crystal molecules in the liquid crystal layer 113 within the liquid crystal cell 110. For example, the spacer 172 may be disposed between the array substrate 111 and the upper polarizing layer 112 to maintain the spacing between the array substrate 111 and the upper polarizing layer 112. For example, the flicker detector 120 may be disposed on the side of the sealing frame 171 adjacent to the liquid crystal layer 113 and/or on the side surface of the spacer 172. As another example, the liquid crystal cell may include a liquid crystal layer, a base substrate, a black matrix, and an upper polarizing layer. The upper polarizing layer is disposed on the side of the base substrate away from the liquid crystal layer. The black matrix is disposed on the side of the base substrate adjacent to the liquid crystal layer. The flicker detector is disposed on the side of the black matrix adjacent to the liquid crystal layer.

For example, the display device 10 may detect the light intensity in the liquid crystal cell 110 by the at least one flicker detector 120 disposed at the above-described positions, and may adjust the magnitude of the common voltage for driving the liquid crystal cell 110 by the signal processing apparatus 130 disposed outside the liquid crystal cell 110, according to the signal strength outputted from the flicker detector 120, in order to reduce the difference value between the driving voltages at the positive and negative frame images and the difference between the rotation degrees of the liquid crystal molecules at the positive and negative frame images. In turn, the difference between the amounts of the polarizing light absorbed and/or scatted by the liquid crystal molecules at the positive and negative frame images and the difference between the light intensities detected by the flicker detector 120 at the positive and negative frame images may be reduced, and thus the flicker value of the display device 10 may be automatically reduced.

For example, the elements included in the display device may be set according to the practical application, and are not particularly limited by the embodiments of the present disclosure. For example, the display device may include only a liquid crystal cell, a flicker detector, and a signal processing apparatus. As another example, the display device may further include, for example, an image data encoding/decoding device, a row scan driver, a column scan driver, a clock circuit, and the like. It should be noted that FIGS. 2 to 4 illustrate only the structure of the display device 10 provided by the embodiments of the present disclosure, and other essential components (for example, a liquid crystal alignment layer) of the display device 10 which are known to those skilled in the art should be readily understood, and will not be repeated herein. This should not be construed as limitation of the embodiments of the present disclosure.

For example, based on the same inventive concept, at least one embodiment of the present disclosure provides a manufacturing method of a display device including: forming a liquid crystal cell; providing a flicker detector, the flicker detector being formed in a non-display region of the liquid crystal cell and configured to detect light intensity of the liquid crystal cell in operation; and providing a signal processing apparatus configured to adjust a magnitude of a common voltage for driving the liquid crystal cell according to a signal strength outputted from the flicker detector, to reduce a flicker value of the display device.

Figure 7:
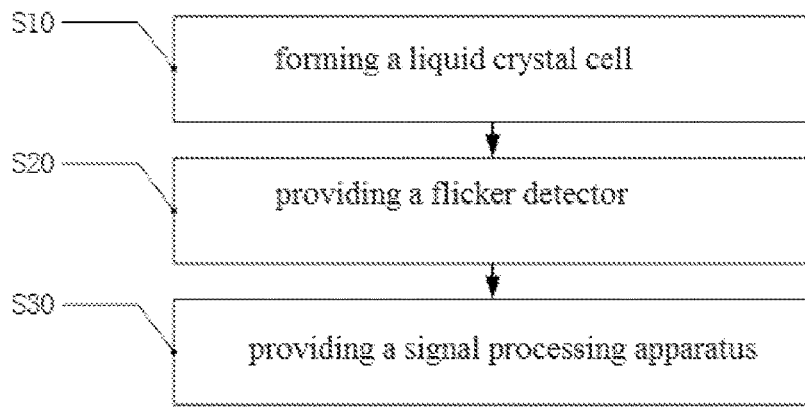
FIG. 7 is a flow chart illustrating an exemplary manufacturing method of a display device provided by another embodiment of the present disclosure.

For example, FIG. 7 is a flow chart illustrating an exemplary manufacturing method of a display device provided by another embodiment of the present disclosure. As shown in FIG. 7, the manufacturing method may include the following steps.

In step S10, a liquid crystal cell is formed.

In step S20, a flicker detector is provided.

In step S30, a signal processing apparatus is provided.

For example, in step S10, the structure of the liquid crystal cell may be set according to the practical application, and is not particularly limited by the embodiments of the present disclosure. For example, the liquid crystal cell may include an array substrate and an upper polarizing layer disposed opposite to the array substrate. For example, the liquid crystal cell may successively include a lower polarizing layer, an array substrate, a liquid crystal layer, an upper polarizing layer having a polarization direction perpendicular to the polarization direction of the lower polarizing layer, and a color filter layer. For example, the color filter layer includes a color filter in an array arrangement and a black matrix disposed between adjacent color filters. For example, the liquid crystal cell may also include a sealing frame and a spacer. For example, the sealing frame may be disposed in the peripheral region of the liquid crystal cell to confine the liquid crystal molecules in the liquid crystal layer within the liquid crystal cell. For example, the spacers may be disposed between the array substrate and the upper polarizing layer to maintain the spacing between the array substrate and the upper polarizing layer.

For example, in step S20, the flicker detector may be disposed in a non-display region within the liquid crystal cell and configured to detect light intensity in the liquid crystal cell. For example, the position and number of flicker detectors within the liquid crystal cell may be set according to practical application, and are not particularly limited by the embodiments of the present disclosure.

For example, the flicker detector may be disposed on one side of the upper polarizing layer away from the array substrate (e.g., the flicker detector may be disposed on the side of the black matrix adjacent to the upper polarizing layer) and may be configured to detect intensity of the light transmitted through the upper polarizing layer within the liquid crystal cell. In this case, the flicker detector is disposed in the non-display region in the liquid crystal cell. As another example, the flicker detector may also be disposed on the side of the sealing frame adjacent to the liquid crystal layer and/or the side surface of the spacer and may be configured to detect light intensity in the liquid crystal cell. For example, when a flicker detector is formed on a counter substrate disposed opposite to the array substrate in a liquid crystal cell by a patterning process, a first electrode of the flicker detector and a first lead electrically connected thereto may be formed firstly by a patterning process, and then PN junctions stacked on one another may be formed by a second patterning process. The PN junction is electrically connected to the first electrode. Finally, a second electrode and a second lead electrically connected thereto are formed by a third patterning process. The PN junction is electrically connected to the second electrode.

For example, the display device may include at least one central flicker detector, which may be disposed at the center of the liquid crystal cell. The display device also includes four edge flicker detectors which may be disposed at four corners of the liquid crystal cell. For example, each of the center and the corners is located in the non-display region within the liquid crystal cell.

For example, the material, structure and forming method of the flicker detector may refer to the embodiments of the display device, and will not be repeated herein.

For example, in step S30, the signal processing apparatus is configured to adjust a magnitude of a common voltage for driving the liquid crystal cell according to a signal strength outputted from the flicker detector, to reduce a flicker value of the display device. For example, the signal processing apparatus may be disposed outside the liquid crystal cell. For example, according to the practical application, the function of the signal processing apparatus may be implemented by an analog circuit, a digital circuit, or a combination of an analog circuit and a digital circuit, or other suitable means. This is not particularly limited by the embodiments of the present disclosure. Below, the signal processing apparatus will be described in detail with reference to an example in which the function of the signal processing apparatus is implemented by an analog circuit. However, the signal processing apparatus provided by the embodiment of the present disclosure is not limited thereto.

For example, the signal processing apparatus may include a flicker value acquisition circuit, a flicker value comparison circuit, and a common voltage adjustment circuit. For example, the signal processing apparatus may further include a flicker-value-signal amplifying circuit depending on the practical application. For example, the specific structure and operation principle of the circuit for realizing the flicker value acquisition circuit, the flicker-value-signal amplifying circuit, the flicker value comparison circuit, and the common voltage adjustment circuit may refer to the embodiments of the display device, which will not be repeated herein.

For example, the display device may detect the light intensity in the liquid crystal cell by at least one flicker detector disposed in the non-display region in the liquid crystal cell, and may adjust the magnitude of the common voltage for driving the liquid crystal cell by the signal processing apparatus disposed outside the liquid crystal cell, according to the signal strength outputted from the flicker detector, in order to reduce the difference value between the driving voltages at the positive and negative frame images and the difference between the rotation degrees of the liquid crystal molecules at the positive and negative frame images. In turn, the difference between the rotation degrees of the polarizing directions of the polarizing light at the positive and negative frame images, and/or the difference between the amounts of the polarizing light absorbed and scattered by the liquid crystal molecules at the positive and negative frame images and the difference between the light intensities detected by the flicker detector at the positive and negative frame images may be reduced, and thus the flicker value of the display device may be automatically reduced.

For example, based on the same inventive concept, at least one embodiment of the present disclosure provides a driving method of a display device including: detecting a light intensity in a liquid crystal cell, and adjusting a magnitude of a common voltage for driving the liquid crystal cell according to a signal strength outputted from a flicker detector, to reduce a flicker value of the display device.

Figure 8:
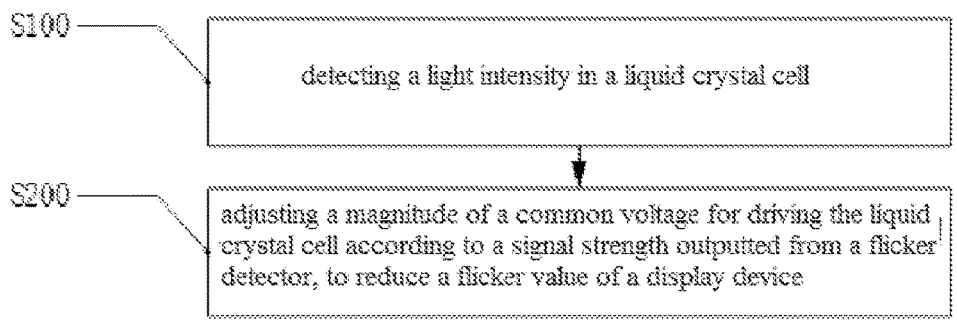
FIG. 8 is a flow chart illustrating an exemplary driving method of a display device provided by yet another embodiment of the present disclosure.

For example, FIG. 8 is a flow chart illustrating a driving method of a display device provided by yet another embodiment of the present disclosure. As shown in FIG. 8, the driving method may include the following steps.

In step S100, a light intensity in a liquid crystal cell is detected.

In step S200, a magnitude of a common voltage for driving the liquid crystal cell is adjusted according to a signal strength outputted from a flicker detector, to reduce a flicker value of the display device.

For example, the light intensity in the liquid crystal cell may be detected by at least one flicker detector disposed in a non-display region in the liquid crystal cell; and the magnitude of the common voltage for driving the liquid crystal cell may be adjusted by for example a signal processing apparatus disposed outside the liquid crystal cell, according to the signal strength outputted from the flicker detector, in order to reduce the difference value between the driving voltages at the positive and negative frame images and the difference between the rotation degrees of the liquid crystal molecules at the positive and negative frame images. In turn, the difference between the rotation degrees of the polarizing directions of the polarizing light at the positive and negative frame images, and/or the difference between the amounts of the polarizing light absorbed and/or scattered by liquid crystal molecules at the positive and negative frame images and the difference between the light intensities detected by the flicker detector at the positive and negative frame images may be reduced, and thus a flicker value of the display device may be automatically reduced.

At least one embodiment of the present disclosure provides a counter substrate, which may include an upper polarizing layer and at least one flicker detector. The at least one flicker detector may be disposed in the counter substrate and located on the light exit side of the upper polarizing layer.

Figure 9A:
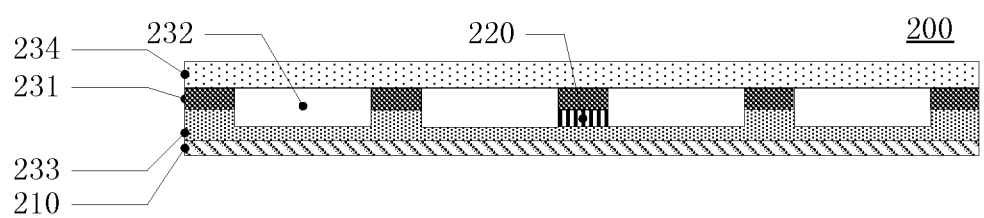
FIG. 9A is a schematic cross-sectional view of a counter substrate provided by yet another embodiment of the present disclosure.
Figure 9B:
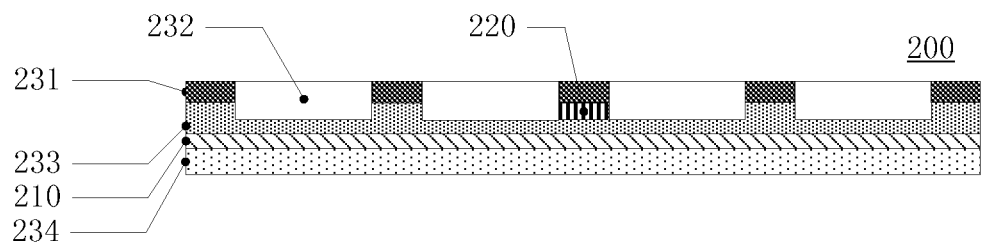
FIG. 9B is a schematic cross-sectional view of another structure of a counter substrate provided by yet another embodiment of the present disclosure.

FIG. 9A is a schematic cross-sectional view of a counter substrate 200 provided by yet another embodiment of the present disclosure, and FIG. 9B is a schematic cross-sectional view of another structure of a counter substrate 200 provided by yet another embodiment of the present disclosure. For example, as shown in FIGS. 9A and 9B, the counter substrate 200 may include an upper polarizing layer 210 and a color filter layer. For example, the color filter layer includes a color filter 232 in an array arrangement and a black matrix 231 disposed between adjacent color filters 232. For example, the color filter 232 may be used to filter white light to obtain light of a particular color to achieve color display. For example, the black matrix 231 may be used to block the light from the gap between the pixel electrodes on the array substrate to enhance the contrast of the image.

For example, the flicker detector 220 may be disposed on one side of the black matrix 231 adjacent to the upper polarizing layer 210 and may be configured to detect light intensity in the liquid crystal cell. In this case, the flicker detector 220 is disposed in a non-display region within the liquid crystal cell.

For example, in order to planarize one side of the color filter 232 adjacent to the upper polarizing layer 210, the liquid crystal cell may further include a flat layer 233 which may be disposed on the side of the color filter 232 adjacent to the upper polarizing layer 210. For example, the liquid crystal cell may further include a base substrate 234 in order to provide support and protection. As shown in FIG. 9A, the base substrate 234 may be disposed on one side of the color filter 232 away from the upper polarizing layer 210. For example, as shown in FIG. 9B, the base substrate 234 may also be disposed on one side of the upper polarizing layer 210 away from the color filter 232.

Apparently, FIGS. 9A and 9B are merely illustrative of the structure of the counter substrate 200 provided by the yet another embodiment of the present disclosure, and the structure of the counter substrate provided by the yet another embodiment of the present disclosure is not limited to that as shown in FIGS. 9A and 9B. For example, the counter substrate may include a base substrate, a color filter layer disposed on the base substrate and a flicker detector. For example, the color filter layer includes a color filter in an array arrangement and a black matrix disposed between adjacent color filters. For example, the flicker detector may be disposed on the side of the black matrix away from the base substrate.

The embodiment of the present disclosure provides a display device and a manufacturing method and a driving method thereof, a display device and a counter substrate, which may automatically reduce the flicker value of the liquid crystal display device by automatically adjusting the common voltage based on the light intensity signal in the liquid crystal cell detected by the flicker detector.

Although the present disclosure has been described in detail by way of general description and specific embodiments thereof, it will be apparent to those skilled in the art that modifications and improvements may be made thereto based on the embodiments of the present disclosure. Accordingly, such modifications or improvements do not depart from the spirit of the present disclosure and still fall within the scope of the present disclosure.

What is claimed is:

1. A display device, comprising:
a liquid crystal cell, comprising:
an array substrate,
an upper polarizing layer, disposed to the array substrate,
a liquid crystal layer, located between the array substrate and the upper polarizing layer,
a sealing frame, disposed in a peripheral region of the liquid crystal cell, to confine liquid crystal molecules in the liquid crystal layer within the liquid crystal cell, and
a spacer, disposed between the array substrate and the upper polarizing layer to maintain a spacing between the array substrate and the upper polarizing layer;
a plurality of flicker detectors, disposed in a non-display region within the liquid crystal cell and configured to detect light intensity in the liquid crystal cell; and
a signal processing apparatus configured to adjust a magnitude of a common voltage for driving the liquid crystal cell according to a signal strength outputted from the plurality flicker detectors, to reduce a flicker value of the display device,
wherein the plurality of flicker detectors include at least one flicker detector that is contacted with at least one of a side surface of the sealing frame facing the liquid crystal layer and a side surface of the spacer facing the liquid crystal layer,
wherein the signal processing apparatus comprises:
a flicker value acquisition circuit configured to acquire a flicker value signal of the display device based on the signal strength outputted from the plurality of flicker detectors, the flicker value signal corresponding to a difference between light intensities of a positive frame image and a negative frame image;

a flicker value comparison circuit configured to determine whether a value of the flicker value signal outputted by the flicker value acquisition circuit is larger than a preset reference signal value and output a flicker value determination signal; and a common voltage adjustment circuit configured to adjust the magnitude of the common voltage for driving the liquid crystal cell to reduce the flicker value of the display device, when the flicker value determination signal indicates that the flicker value signal outputted from the flicker value acquisition circuit is larger than the preset reference signal value, wherein the flicker value acquisition circuit comprises a plurality of capacitors corresponding to the plurality of flicker detectors respectively, each of the capacitors is configured to acquire a difference value between outputted voltages of a corresponding flicker detector for the positive frame image and the negative frame image, wherein the flicker value acquisition circuit is configured to take a sum or an average value of the different values between the outputted voltages of the plurality of flicker detectors for the positive frame image and the negative frame image as the flicker value signal.

2. The display device according to claim 1, wherein the plurality of flicker detectors include a flicker detector that is further disposed at one side of the upper polarizing layer away from the array substrate.

3. The display device according to claim 2, wherein the liquid crystal cell further comprises a black matrix disposed on one side of the flicker detector away from the array substrate.

4. The display device according to claim 1, further comprising one central flicker detector disposed at the center of the liquid crystal cell.

5. The display device according to claim 2, further comprising one central flicker detector disposed at the center of the liquid crystal cell.

6. The display device according to claim 3, further comprising one central flicker detector disposed at the center of the liquid crystal cell.

7. The display device according to claim 4, further comprising four edge flicker detectors disposed at four corners of the liquid crystal cell.

8. The display device according to claim 5, further comprising four edge flicker detectors disposed at four corners of the liquid crystal cell.

9. The display device according to claim 6, further comprising four edge flicker detectors disposed at four corners of the liquid crystal cell.

10. The display device according to claim 1, wherein the plurality of flicker detectors comprise photoelectric induction material.

11. The display device according to claim 2, wherein the plurality of flicker detectors comprise photoelectric induction material.

12. The display device according to claim 3, wherein the plurality of flicker detectors comprise photoelectric induction material.

13. The display device according to claim 10, wherein the plurality of flicker detectors comprise a PIN junction having a photosensitive characteristic.

14. The display device according to claim 1, wherein the signal processing apparatus further comprises: a flicker-value-signal amplifying circuit configured to amplify the flicker value signal outputted from the flicker value acquisition circuit and transmit the amplified flicker value signal to the flicker value comparison circuit.

15. The display device according to claim 14, wherein the flicker-value- signal amplifying circuit is a negative feedback amplifier circuit, the flicker-value-signal amplifying circuit comprises:

a first operational amplifier comprising a first op-amp in-phase input terminal, a first op-amp inverting input terminal and a first op-amp output terminal;

a first resistor disposed between an output terminal of the flicker value acquisition circuit and the first op-amp inverting input terminal; and a second resistor disposed between the first op-amp inverting input terminal and the first op-amp output terminal, and the first op-amp in-phase input terminal is grounded.

16. The display device according to claim 1 wherein the flicker value comparison circuit is a second operational amplifier, the second operational amplifier comprises a second op-amp in-phase input terminal, a second op-amp inverting input terminal, and a second op-amp output terminal;

a flicker value signal and a preset reference signal are supplied respectively by the second op-amp in-phase input terminal and the second op-amp inverting input terminal to the operational amplifier, or is supplied respectively by the second op-amp inverting input terminal and the second op-amp in-phase input terminal to the operational amplifier; and the second op-amp output terminal outputs the flicker value determination signal acquired based on the flicker value signal and the preset reference signal.

* * * * *